US010139562B2

(12) United States Patent
Kim et al.

(10) Patent No.: US 10,139,562 B2
(45) Date of Patent: Nov. 27, 2018

(54) PLANAR LIGHTWAVE CIRCUIT-BASED INTEGRATED OPTICAL CHIP

(71) Applicant: KOREA ADVANCED INSTITUTE OF SCIENCE AND TECHNOLOGY, Daejeon (KR)

(72) Inventors: Jung Won Kim, Daejeon (KR); Chur Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/746,184

(22) PCT Filed: Oct. 6, 2015

(86) PCT No.: PCT/KR2015/010527
§ 371 (c)(1),
(2) Date: Jan. 19, 2018

(87) PCT Pub. No.: WO2017/018596
PCT Pub. Date: Feb. 2, 2017

(65) Prior Publication Data
US 2018/0210148 A1    Jul. 26, 2018

(30) Foreign Application Priority Data

Jul. 24, 2015  (KR) .................. 10-2015-0105081
Sep. 25, 2015  (KR) .................. 10-2015-0136577

(51) Int. Cl.
*G02B 6/12*  (2006.01)
*H01S 3/11*  (2006.01)
(Continued)

(52) U.S. Cl.
CPC ..... *G02B 6/12007* (2013.01); *G02B 6/12004* (2013.01); *G02B 6/136* (2013.01);
(Continued)

(58) Field of Classification Search
None
See application file for complete search history.

(56) References Cited

U.S. PATENT DOCUMENTS

2005/0135449 A1*  6/2005  Sorin ............... H04B 10/506
                                                  372/50.1
2010/0124245 A1*  5/2010  Kobayashi .......... B82Y 20/00
                                                  372/46.01

FOREIGN PATENT DOCUMENTS

JP        09288288 A    11/1997
JP      2001352123 A    12/2001
(Continued)

OTHER PUBLICATIONS

International Search Report and Written Opinion Form PCT/ISA/210 and PCT/ISA/237, International Application No. PCT/KR2015/010527, pp. 1-8, International Filing Date Oct. 6, 2015, dated Apr. 22, 2016.

*Primary Examiner* — Jerry Rahll
(74) *Attorney, Agent, or Firm* — Bond Schoeneck & King, PLLC; George McGuire

(57) ABSTRACT

In an embodiment, an integrated optical chip comprises: a substrate; a plurality of planar lightwave circuit-based optical components that are formed on one surface of the substrate; and a plurality of optical waveguides that are formed on the one surface of the substrate and that connect the plurality of optical components to one another. In the embodiment, the plurality of optical components includes a saturable absorber having nonlinear loss characteristics. The saturable absorber may comprise: a core layer that is formed on the one surface of the substrate; an overcladding layer that wraps around at least a part of the core layer; and a saturable absorption layer that is formed on at least a part of (Continued)

the overcladding layer and that is arranged so as to interact with an evanescent field of light guided through at least a part of the core layer.

14 Claims, 13 Drawing Sheets

(51) Int. Cl.
    *G02B 6/136* (2006.01)
    *H01S 3/0941* (2006.01)

(52) U.S. Cl.
    CPC .. *H01S 3/1115* (2013.01); *G02B 2006/12173* (2013.01); *H01S 3/0941* (2013.01)

(56) References Cited

FOREIGN PATENT DOCUMENTS

| | | |
|---|---|---|
| KR | 100317575 B1 | 12/2001 |
| KR | 20040050423 A | 6/2004 |
| KR | 20070085077 A | 8/2007 |
| KR | 20080101862 A | 11/2008 |
| KR | 101059310 B1 | 8/2011 |
| KR | 101097175 B1 | 12/2011 |

\* cited by examiner

PLANAR LIGHTWAVE CIRCUIT-BASED INTEGRATED OPTICAL CHIP

CROSS-REFERENCE TO RELATED APPLICATIONS

This application is the United States National Phase Entry of PCT Application No. PCT/KR2015/010527 filed on Oct. 6, 2015, which claims priority to Korean patent application No. 2015-0136577, filed on Sep. 25, 2015, and Korean patent application No. 10-2015-0105081, filed on Jul. 24, 2015, the entire disclosure of each of which is incorporated herein by reference.

TECHNICAL FIELD

Example embodiments relate to a planar lightwave circuit-based integrated optical chip, and more particularly, to a method of integrating a plurality of optical components into a single optical chip through, for example, a dicing process, for mass production.

BACKGROUND ART

Femtosecond laser technology has a relatively short history in commercialization and industrial application, and many research institutes around the world have been actively conducting research into femtosecond lasers and other various related fields of application. Examples of industrial applications of a femtosecond laser-based system are found in micro-precision processing, glass welding, direct laser writing, generation of nanoparticles, lasers for medical treatment, and bio-imaging using a nonlinear optical phenomenon. In addition, application fields related to a femtosecond laser are continuously expanded due to characteristics of the femtosecond laser that have not been implemented in existing electronic systems. The characteristics of the femtosecond laser include a pulse width less than a picosecond, a high peak power, a wide optical spectrum, a low phase noise characteristic, a low timing noise characteristic, and the like.

However, commercial femtosecond lasers that have been developed up to the present are manufactured by combining solid crystal or optical fiber-based optical components, and thus it may be difficult to mass produce such femtosecond lasers and it may cost a lot to manufacture a femtosecond laser. A general-type solid crystal-based femtosecond laser may require an ineffective production process that requires manual operations of a skilled person in the related field of art to precisely align optical paths of optical components and configure an optical cavity or an optical resonator, and discover a mode-locking condition. In addition, an optical fiber-based femtosecond laser may also require manual operations of a skilled person in the related field of art because optical fiber components need to be spliced together, and a length of the resonator and a volume of the laser may increase.

Thus, there is a desire for technology to more effectively produce optical components used for a femtosecond laser.

DISCLOSURE OF INVENTION

Technical Solutions

According to an example embodiment, there is provided an integrated optical chip including a substrate, a plurality of planar lightwave circuit-based optical components that is formed on one surface of the substrate, and a plurality of optical waveguides that is formed on the one surface of the substrate and connects the optical components to one another.

The optical components may include a saturable absorber having a nonlinear loss characteristic. The saturable absorber may include a core layer formed on the one surface of the substrate, an overcladding layer covering at least a portion of the core layer, and a saturable absorption layer formed on at least a portion of the overcladding layer and disposed to interact with an evanescent field of light guided through at least a portion of the core layer. The saturable absorption layer may include at least one of a carbon nanostructure or a topological insulator.

The optical components may include a wavelength division multiplexer. The wavelength division multiplexer may include a core layer formed on the one surface of the substrate and including a plurality of separated optical waveguides, and an overcladding layer covering at least a portion of the core layer.

The optical components may include an output coupler. The output coupler may include a core layer formed on the one surface of the substrate and including a plurality of separated optical waveguides, and an overcladding layer covering at least a portion of the core layer.

The substrate may include a material having a refractive index lower than a refractive index of the optical waveguides. The integrated optical chip may further include an undercladding layer interposed between the substrate and the optical waveguides. The undercladding layer may include a material having a refractive index lower than a refractive index of the optical waveguides. The optical components and the optical waveguides may be formed using at least one of a deposition process, a photolithography process, an etching process, or an ion exchange process.

According to another example embodiment, there is provided a pulse laser device including an integrated optical chip including a substrate, a plurality of planar lightwave circuit-based optical components that is formed on one surface of the substrate, and a plurality of optical waveguides that is formed on the one surface of the substrate and connects the optical components to one another, and at least one optical fiber array block (FAB) configured to connect an optical waveguide of at least one end portion of the integrated optical chip and a core of at least one optical fiber.

According to still another example embodiment, there is provided a pulse laser device including an integrated optical chip including a substrate, a plurality of planar lightwave circuit-based optical components that is formed on one surface of the substrate, and a plurality of optical waveguides that is formed on the one surface of the substrate and connects the optical components to one another, a first optical chip including a pumping light source module, and a second optical chip including a gain medium. A a first end portion of the integrated optical chip may be connected to the first optical chip, and a second end portion of the integrated optical chip may be connected to the second optical chip.

According to yet another example embodiment, there is provided a method of manufacturing an integrated optical chip, the method including providing a wafer, forming an optical waveguide on the wafer, forming an overcladding layer on the wafer and the optical waveguide, removing at least a portion of the overcladding layer, and forming, on the overcladding layer, a saturable absorption layer having a nonlinear loss characteristic. The saturable absorption layer may be disposed to interact with an evanescent field of light guided through at least a portion of the optical waveguide.

The forming of the optical waveguide may include forming a core layer on the wafer, and forming an optical waveguide that is extended with a rectangular cross section by removing at least a portion of the core layer. The method may further include forming a mask layer on the core layer, and removing at least a portion of the mask layer through a photolithography process. The method may further include dividing the wafer into a plurality of integrated optical chips by cutting the wafer.

The saturable absorption layer may include at least one of a carbon nanostructure or a topological insulator. The wafer may include a material having a refractive index lower than a refractive index of the optical waveguide. The method may further include forming, on the wafer, an undercladding layer including a material having a refractive index lower than a refractive index of the optical waveguide, and the forming of the core layer may include forming the core layer on the undercladding layer.

BEST MODE FOR CARRYING OUT THE INVENTION

Figure 1:
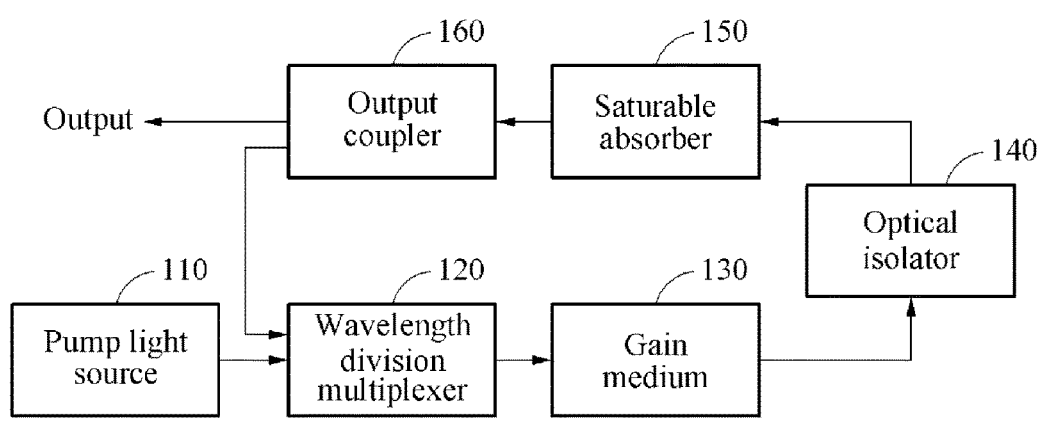
FIG. 1 is a diagram illustrating an example of a portion of a femtosecond laser according to an example embodiment.

Hereinafter, example embodiments will be described in detail with reference to the accompanying drawings. It should be understood, however, that there is no intent to limit the present disclosure to particular example embodiments described herein. Regarding the reference numerals assigned to the elements in the drawings, it should be noted that the same elements will be designated by the same reference numerals, wherever possible, even though they are shown in different drawings.

The example embodiments are described herein using terms most generally and widely used in related technical fields. However, other terms may also be used based on development and/or change of related technologies, practices, preferences by one of ordinary skill in the art, and the like. Thus, the terminology used herein is for the purpose of describing particular example embodiments only and is not intended to limit technical features.

In addition, terms selected by an applicant(s) may also be used herein, and the meanings of such terms are described in the present disclosure. The terms used herein are not to be interpreted based solely on the terms themselves, but to be interpreted based on the meanings of the terms as defined herein and the overall context of the present disclosure.

FIG. 1 is a diagram illustrating an example of a portion of a femtosecond laser according to an example embodiment. According to an example embodiment, a femtosecond laser includes a pump light source 110, a wavelength division multiplexer 120, a gain medium 130, an optical isolator 140, a saturable absorber 150, and an output coupler 160.

Figure 4A:
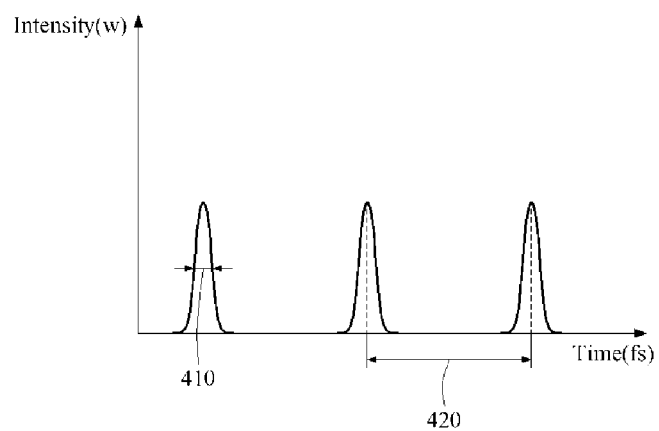
FIG. 4a is a graph illustrating an output of a femtosecond laser in a time domain according to an example embodiment.
Figure 4B:
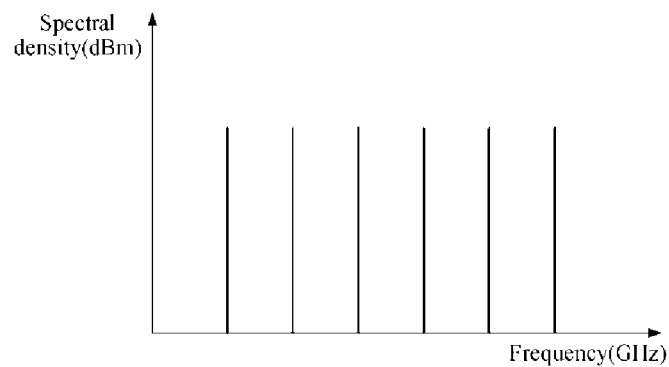
FIG. 4b is a graph illustrating an output of a femtosecond laser in a frequency domain according to an example embodiment.

The femtosecond laser refers to a laser configured to generate an optical pulse train using an optical cavity or an optical resonator having a gain and saturable absorption function, and may be different from a continuous wave laser that is traditionally and widely used in related art. An output of the femtosecond laser may be in a time domain as illustrated in FIG. 4a. Referring to FIG. 4a, the femtosecond laser generates an optical pulse train having a constant pulse width 410 and a constant period 420. In addition, an output of the femtosecond laser may also be in a frequency domain as illustrated in FIG. 4b. As illustrated, mode-locking in which a plurality of frequency modes is oscillated simultaneously may be implemented.

Referring back to FIG. 1, the wavelength division multiplexer 120, the gain medium 130, the optical isolator 140, the saturable absorber 150, and the output coupler 160 may form a portion of the optical resonator of the femtosecond laser. In an example embodiment, the optical resonator may include a ring-type resonator.

The pump light source 110 of the femtosecond laser may provide pump light input into the optical resonator. The pump light source 110 may include, for example, a laser diode. The pump light provided by the pump light source 110 may be input to the optical resonator through the wavelength division multiplexer 120.

The wavelength division multiplexer 120 of the femtosecond laser may guide light with a certain wavelength to a desired path. For example, the wavelength division multiplexer 120 may guide light input from the pump light source 110 to be input to the gain medium 130 in the optical resonator. In addition, the wavelength division multiplexer 120 may also guide signal light output from the gain medium 130 not to be deviate from the inside of the optical resonator when the signal light passes the wavelength division multiplexer 120. In an example embodiment, the wavelength division multiplexer 120 may be embodied in a form of a directional coupler or a multimode interference coupler. A connection path and an embodied type of the wavelength division multiplexer 120 may be selected as provided herein as an example or selected based on a design requirement.

The femtosecond laser may obtain the gain in the optical resonator using the gain medium 130. In an example embodiment, the gain medium 130 may include an erbium (Er)-doped medium or an ytterbium (Yb)-doped medium. The gain medium 130 may be embodied in a form of an optical fiber or a chip. A material included in the gain medium 130 and an embodied type of the gain medium 130 may be selected as provided herein as an example or selected based on a design requirement.

The femtosecond laser may induce unidirectional resonance using the optical isolator 140.

Figure 4C:
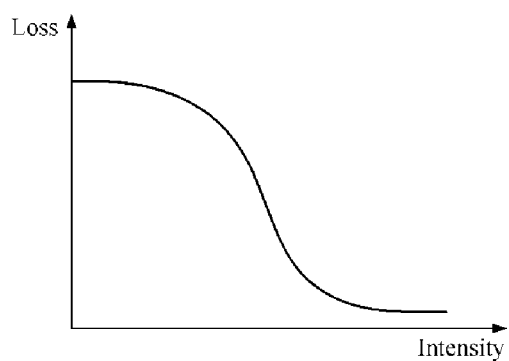
FIG. 4c is a graph illustrating a characteristic of a saturable absorber according to an example embodiment.

In addition, the femtosecond laser may implement the saturable absorption function inside the optical resonator using the saturable absorber 150 having a nonlinear loss characteristic. The nonlinear loss characteristic used herein refers to a characteristic in which a loss rate of light decreases as an intensity of incident light increases. FIG. 4c is a graph illustrating an example of such a nonlinear loss characteristic. The saturable absorber 150 may include, for example, a carbon nanostructure or a topological insulator that has such a nonlinear loss characteristic. A material included in the saturable absorber 150 and an embodied type of the saturable absorber 150 may be selected as provided herein as an example or selected based on a design requirement.

The femtosecond laser may output, through the output coupler 160, a mode-locked optical pulse train that is generated in the optical resonator. The output coupler 160 may include, for example, a 10:90 optical coupler configured to output 10% of light. In an example embodiment, the output coupler 160 may be embodied in a form of a directional coupler, a multimode interference coupler, a Y-branch, or a loop mirror. An output rate and an embodied type of the output coupler 160 may be selected as provided herein as an example or selected based on a design requirement.

Figure 2:
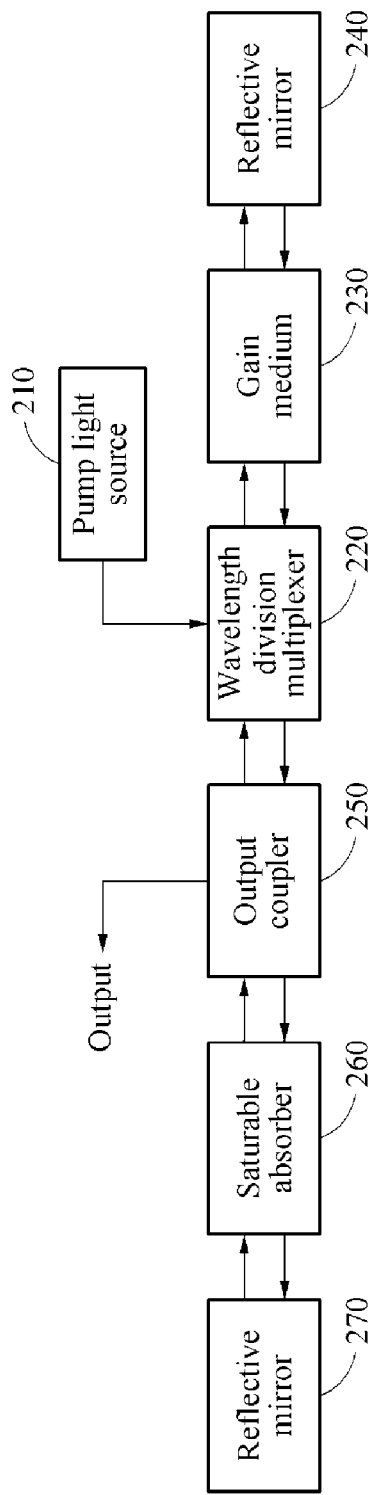
FIG. 2 is a diagram illustrating an example of a portion of a femtosecond laser according to an example embodiment.

FIG. 2 is a diagram illustrating an example of a portion of a femtosecond laser according to an example embodiment. According to an example embodiment, a femtosecond laser includes a pump light source 210, a wavelength division multiplexer 220, a gain medium 230, reflective mirrors 240 and 270, an output coupler 250, and a saturable absorber 260. The pump light source 210, the wavelength division multiplexer 220, the gain medium 230, the reflective mirrors 240 and 270, the output coupler 250, and the saturable absorber 260 may form a portion of an optical cavity or an optical resonator of the femtosecond laser. In an example embodiment, the optical resonator may include a linear-type resonator.

The reflective mirrors 240 and 270 of the femtosecond laser may reflect an entirety or a portion of light to be input, or incident light. The femtosecond laser may select a resonator mode with a certain wavelength due to interference of light inside the optical resonator, using the reflective mirrors 240 and 270.

For a detailed description of the femtosecond laser illustrated in FIG. 2, reference may be made to the description provided with reference to FIG. 1, and thus a more detailed and repeated description is omitted here for brevity.

Figure 3:
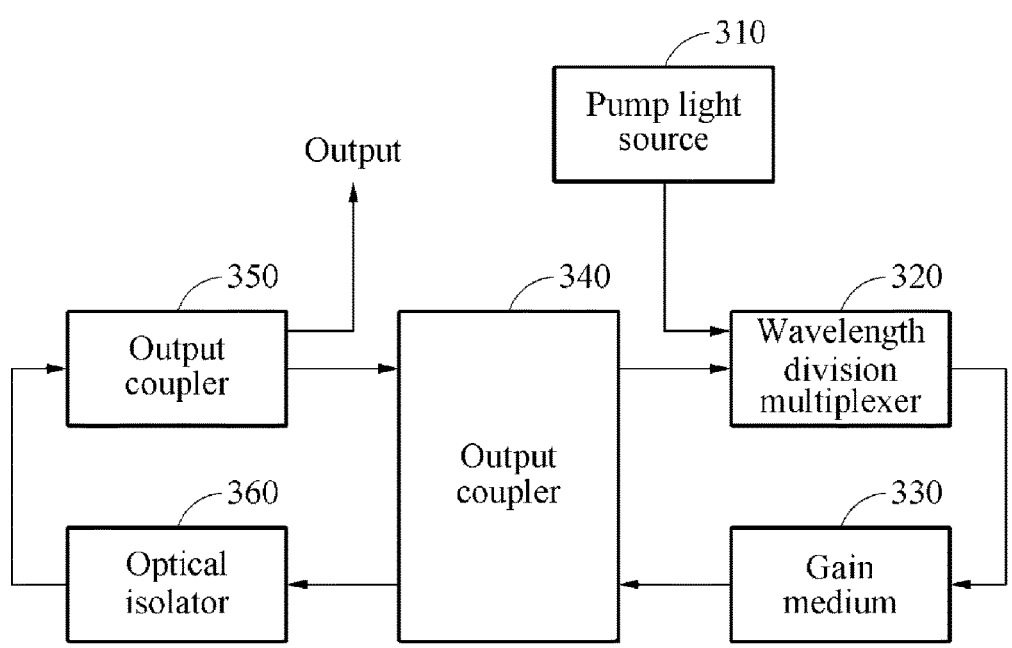
FIG. 3 is a diagram illustrating an example of a portion of a femtosecond laser according to an example embodiment.

FIG. 3 is a diagram illustrating an example of a portion of a femtosecond laser according to an example embodiment. According to an example embodiment, a femtosecond laser includes a pump light source 310, a wavelength division multiplexer 320, a gain medium 330, output couplers 340 and 350, and an optical isolator 360. The pump light source 310, the wavelength division multiplexer 320, the gain medium 330, the output couplers 340 and 350, and the optical isolator 360 may form a portion of an optical cavity or an optical resonator of the femtosecond laser. In an example embodiment, the optical resonator may include a figure 8-type resonator.

For a detailed description of the femtosecond laser illustrated in FIG. 3, reference may be made to the descriptions provided with reference to FIGS. 1 and 2, and thus a more detailed and repeated description is omitted here for brevity.

As described above, a femtosecond laser according to an example embodiment may include a plurality of optical components, and have a cavity or a resonator in various forms or types in addition to those described herein. However, precisely arranging optical paths of solid crystal-based optical components or connecting optical fiber-based optical components through splicing may not be effective in terms of a volume of the femtosecond laser and a complexity of a production process of the femtosecond laser. To improve such an issue, a plurality of planar lightwave circuit-based optical components may be used to embody the femtosecond laser.

Figure 5A:
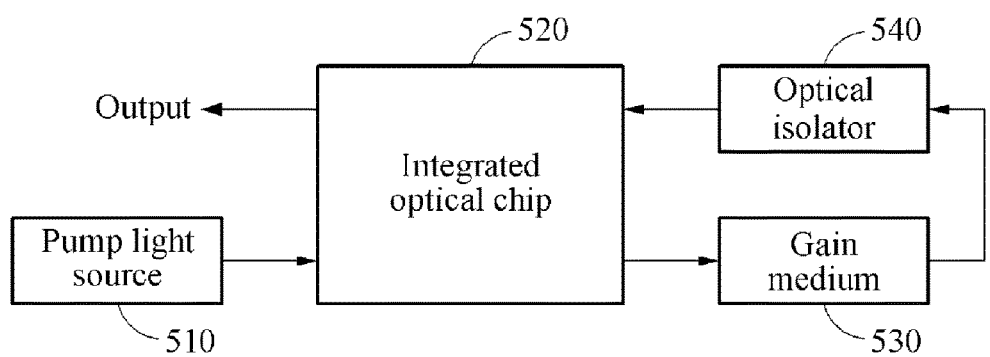
FIGS. 5a and 5b are diagrams illustrating examples of a portion of a femtosecond laser according to an example embodiment.
Figure 5B:
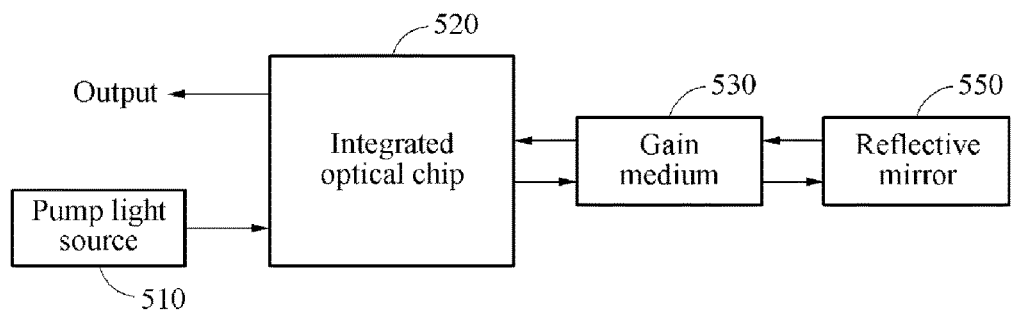

FIGS. 5a and 5b are diagrams illustrating examples of a femtosecond laser according to an example embodiment. According to an example embodiment, a femtosecond laser includes a pump light source 510, an integrated optical chip 520, a gain medium 530, and an optical isolator 540. According to another example embodiment, a femtosecond laser includes the pump light source 510, the integrated optical chip 520, the gain medium 530, and a reflective mirror 550.

Dissimilar to the femtosecond laser illustrated in FIGS. 1 through 3, the femtosecond laser illustrated in FIGS. 5a and 5b includes the integrated optical chip 520 that is formed by integrating a plurality of optical components in a single chip. In an example embodiment, a plurality of planar lightwave circuit-based optical components may be integrated in the integrated optical chip 520. For example, the optical components may include at least one of a wavelength division multiplexer, a saturable absorber, or an output coupler. That is, some of the wavelength division multiplexer, the saturable absorber, and the output coupler may be integrated in the integrated optical chip 520. Alternatively, other optical components may be integrated in the integrated optical chip 520. In addition, the integrated optical chip 520 may also include a plurality of optical waveguides that connects the optical components to one another.

Using the integrated optical chip 520, a single chip in which functions of the optical components are implemented therein, a production process thereof may be simplified considerably because there is no need to connect the optical components through splicing or butt-coupling. In addition, a length of an optical fiber used and a laser volume may be reduced compared to using the optical components individually. A structure and a production process of the integrated optical chip 520 will be described in greater detail hereinafter.

Figure 6A:
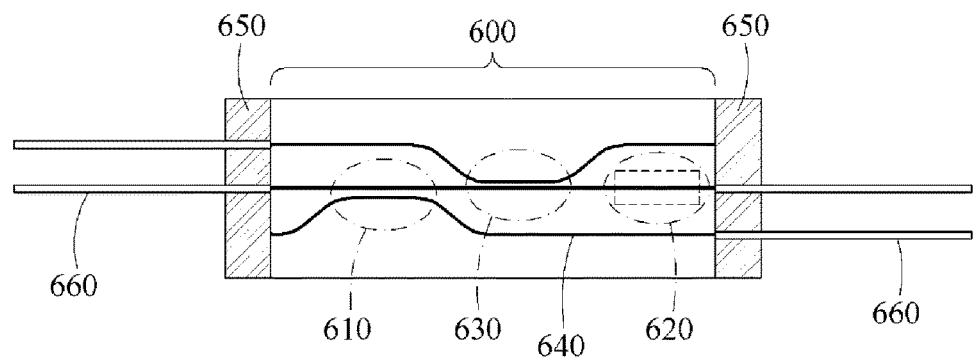
FIGS. 6a through 6d are a planar view and perspective views of an integrated optical chip according to an example embodiment.

FIG. 6a is a planar view of an integrated optical chip 600 according to an example embodiment. The integrated optical chip 600 includes a plurality of planar lightwave circuit-based optical components, and a plurality of optical waveguides 640 that connects the optical components to one another. The optical components may include, for example, a wavelength division multiplexer 610, a saturable absorber 620, and an output coupler 630.

In an example embodiment, the wavelength division multiplexer 610 may include a plurality of separated optical waveguides that extends in a same direction at regular intervals therebetween. The separated optical waveguides may be formed as a portion of a core layer having a refractive index suitable for generating total reflection. In addition, the wavelength division multiplexer 610 may include an overcladding layer that covers at least a portion of the separated optical waveguides. The wavelength division multiplexer 610 may be embodied in different forms and provided at different locations from the illustrated example, and thus a form and a location thereof may not be limited to the illustrated example.

In an example embodiment, the saturable absorber 620 may include a saturable absorption layer that interacts with the optical waveguides 640 and an evanescent field of light guided through and at least a portion of the optical waveguides. The optical waveguides 640 may be formed as a portion of the core layer having a refractive index suitable for generating total reflection. The saturable absorption layer may include a carbon nanostructure or a topological insulator that has a nonlinear loss characteristic. For example, the carbon nanostructure may include a graphene or a carbon nanotube, and the topological insulator may include one of $Bi_2Se_3$, $Bi_2Te_3$, and $Sb_2Te_3$. In addition, the saturable absorber 620 may include an overcladding layer that covers at least a portion of the optical waveguides 640. The saturable absorber 620 may be embodied in different forms and provided at different locations from the illustrated example, and thus a form and a location thereof may not be limited to the illustrated example.

In an example embodiment, the output coupler 630 may include a plurality of separated optical waveguides that extends in a same direction at regular intervals therebetween. The separated optical waveguides may be formed as a portion of the core layer having a refractive index suitable for generating total reflection. In addition, the output coupler 630 may include an overcladding layer that covers at least a portion of the separated optical waveguides. The output coupler 630 may be embodied in different forms and provided at different locations from the illustrated example, and thus a form and a location thereof may not be limited to the illustrated example.

In an example embodiment, the optical waveguides 640 may connect the optical components, for example, the wavelength division multiplexer 610, the saturable absorber 620, and the output coupler 630. In addition, the optical waveguides 640 may connect the optical components to at least one end portion of the integrated optical chip 600. For example, the optical waveguides 640 may have a rectangular cross section to extend. In addition, the optical waveguides 640 may be formed as a portion of the core layer having a refractive index suitable for generating total reflection.

In an example embodiment, the integrated optical chip 600 may be combined with at least one optical fiber array block (FAB) 650. For example, both end portions of the integrated optical chip 600 may be connected to the optical FAB 650. The optical FAB 650 may connect the optical waveguides 640 in the integrated optical chip 600 to a core of at least one optical fiber 660. As described, the integrated optical chip 600 may be connected to an external optical component through the optical FAB 650.

Figure 6B:
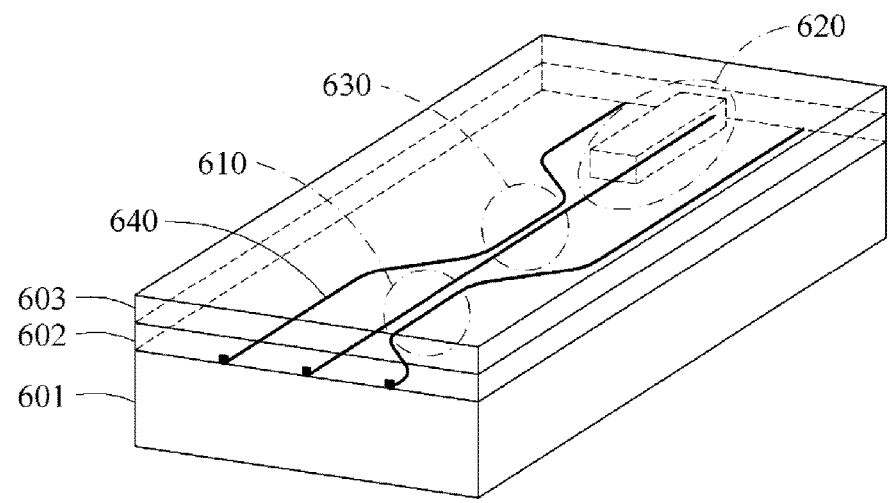

FIG. 6b is a perspective view of the integrated optical chip 600 according to an example embodiment. In an example embodiment, the integrated optical chip 600 includes a substrate 601, an overcladding layer 602 formed on at least a portion of the substrate 601, and a saturable absorption layer 603 formed on at least a portion of the overcladding layer 602. In addition, the integrated optical chip 600 includes a core layer formed on at least a portion of the substrate 601. The core layer may include a wavelength division multiplexer 610, a saturable absorber 620, an output coupler 630, and at least a portion of a plurality of optical waveguides 640. The core layer may include a material having a refractive index greater than that of the substrate 601 and the overcladding layer 602 to generate total reflection.

In another example embodiment, the integrated optical chip 600 may further include an undercladding layer (not shown) formed between the substrate 601 and the core layer. For example, in a case in which the substrate 601 has a refractive index greater than that of the core layer, the undercladding layer having a refractive index lower than that of the core layer may be interposed between the substrate 601 and the core layer to allow the optical waveguides 640 formed as a portion of the core layer to generate total reflection.

Figure 6C:
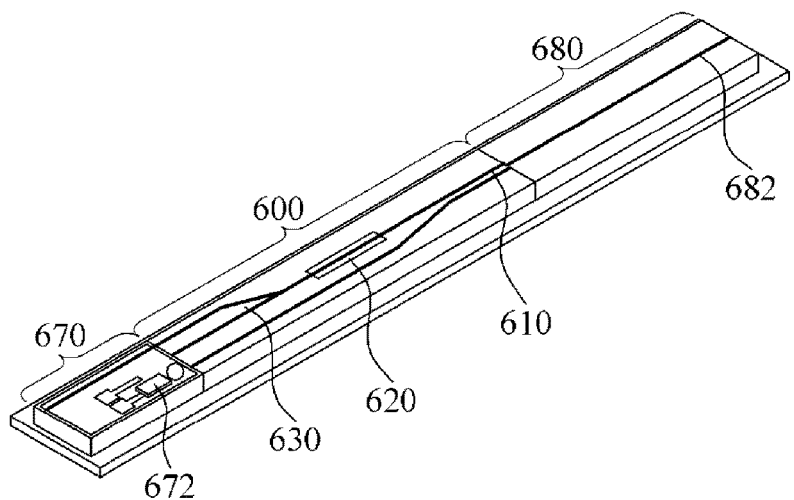

FIG. 6c is a perspective view of the integrated optical chip 600 according to an example embodiment. In an example embodiment, the integrated optical chip 600 may be combined with one or more optical chips, for example, a first optical chip 670 and a second optical chip 680. For example, both end portions of the integrated optical chip 600 may be connected to the first optical chip 670 including a pumping light source module 672 and to the second optical chip 680 including an optical waveguide-based gain medium 682. In an example embodiment, the integrated optical chip 600 and the one or more optical chips 670 and 680 may be combined through an ultraviolet curing method. As described, the integrated optical chip 600 may be connected to an external optical component through the one or more optical chips 670 and 680.

Figure 6D:
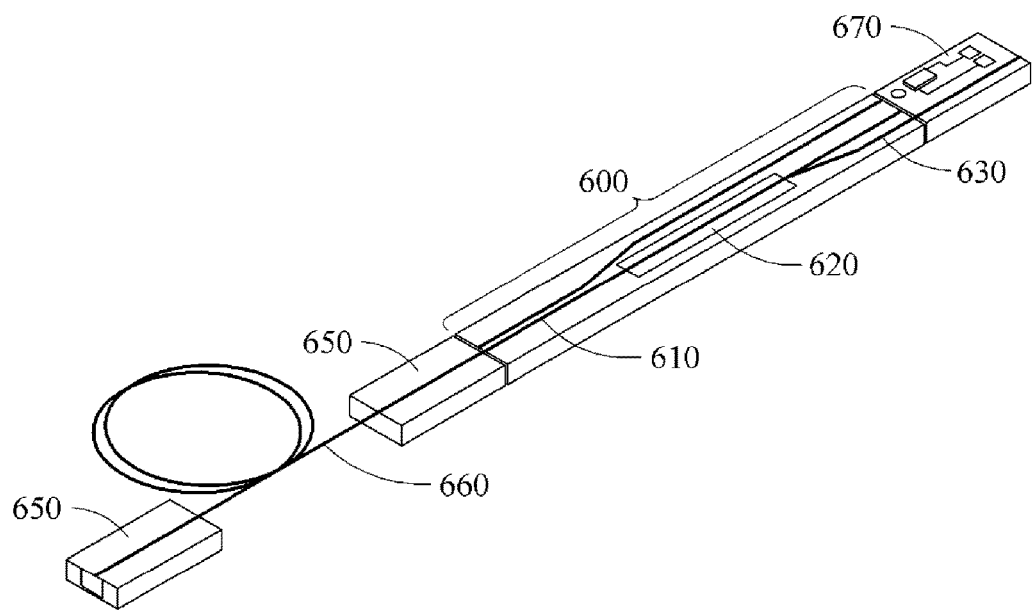

FIG. 6d is a perspective view of the integrated optical chip 600 according to an example embodiment. In an example embodiment, the integrated optical chip 600 may be combined with at least one optical FAB 650 and at least one optical chip 670. For example, both end portions of the integrated optical chip 600 may be connected to the optical FAB 650 and the optical chip 670 including a pumping light source module. The optical FAB 650 may connect optical waveguides in the integrated optical chip 600 to a core of at least one optical fiber 660. As described, the integrated optical chip 600 may be connected to an external optical component through the optical FAB 650 and the optical chip 670.

Figure 7:
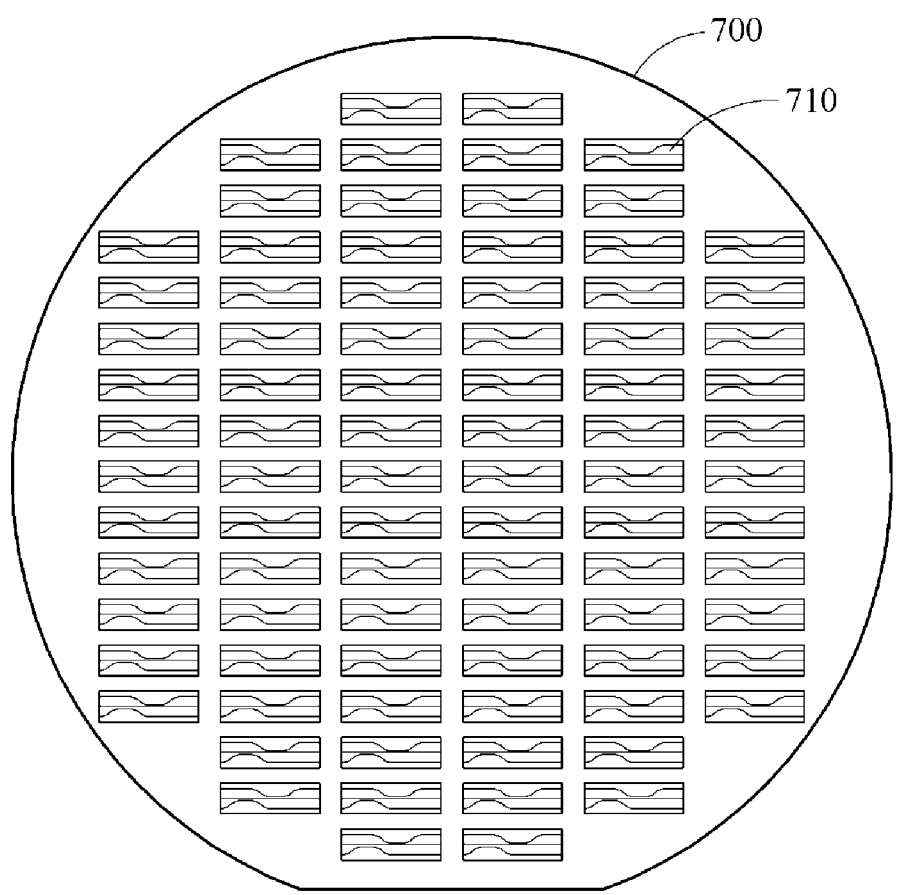
FIG. 7 is a diagram illustrating an example of a production process of an integrated optical chip according to an example embodiment.

FIG. 7 is a diagram illustrating an example of a production process of an integrated optical chip according to an example embodiment. As illustrated in FIG. 7, by performing a dicing process after manufacturing a plurality of integrated optical chips 710 on a single wafer 700, a great number of the integrated optical chips 710 may be produced at once. A process of manufacturing the integrated optical chips 710 may include, for example, a deposition process, a photolithography process, an etching process, and an ion exchange process. Through such a production process, the integrated optical chips 710 in which a plurality of optical components is integrated may be mass-produced. Thus, compared to an existing production process of femtosecond lasers, productivity may be improved greatly in terms of time consumption and costs.

FIGS. 8a through 8j are diagrams illustrating an example of a flow of a production process of an integrated optical chip according to an example embodiment.

Figure 8A:
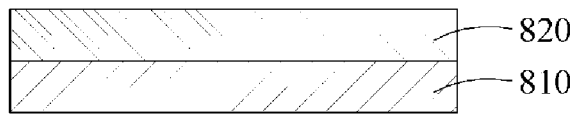
FIGS. 8a through 8m are diagrams illustrating an example of a flow of a production process of an integrated optical chip according to an example embodiment.

FIG. 8a illustrates a step in which a core layer 820 is formed on a wafer 810. For example, the core layer 820 may be deposited through chemical vapor deposition (CVD). In an example embodiment, the wafer 810 may include silicon (Si) or silica ($SiO_2$), and the core layer 820 may include a material having a refractive index greater than that of the wafer 810.

Figure 8B:
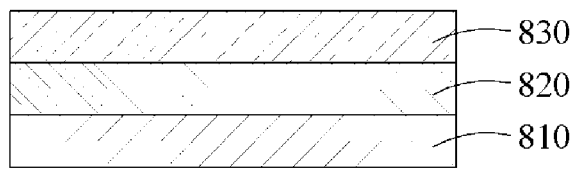

FIG. 8b illustrates a step in which a mask layer 830 is formed on the core layer 820. For example, the mask layer 830 may be deposited through sputtering. In an example embodiment, the mask layer 830 may include chromium (Cr).

Figure 8C:
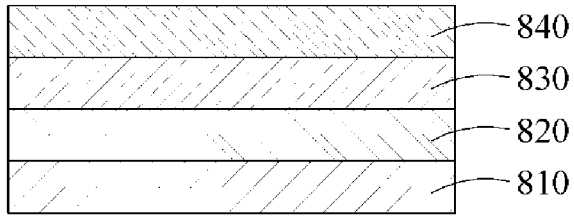

FIG. 8c illustrates a step in which a photoresist layer 840 is formed on the mask layer 830. For example, the photoresist layer 840 may be coated through spin coating.

Figure 8D:
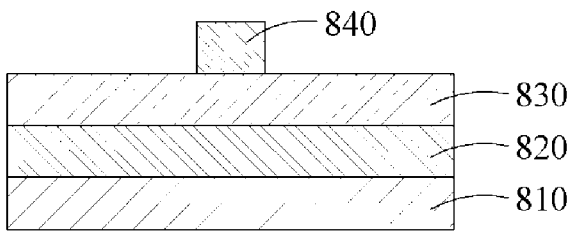

FIG. 8d illustrates a step in which a pattern is formed on the photoresist layer 840. For example, the pattern is formed by exposure using a mask aligner.

Figure 8E:
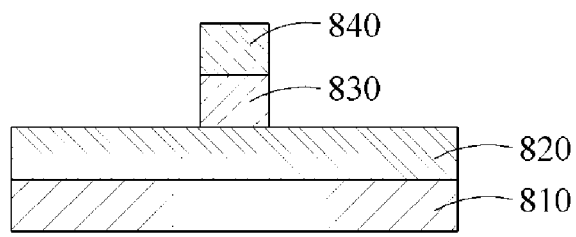

FIG. 8e illustrates a step in which at least a portion of the mask layer 830 is removed. For example, the mask layer 830 may be etched using an etchant for the mask layer 830.

Figure 8F:
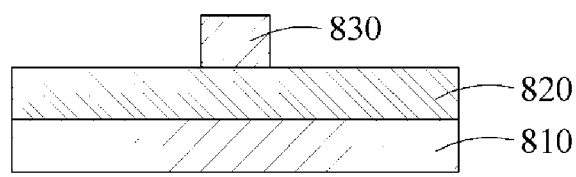

FIG. 8f illustrates a step in which the photoresist layer 840 is removed. For example, the photoresist layer 840 may be removed using a photoresist stripper for the photoresist layer 840.

Figure 8G:
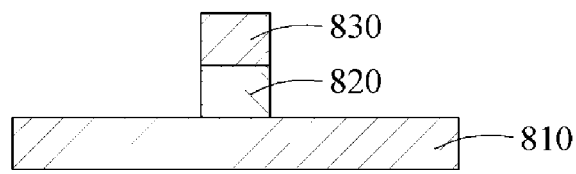

FIG. 8g illustrates a step in which a portion of the core layer 820 is removed. For example, the core layer 820 may be etched using an inductively-coupled plasma.

Figure 8H:
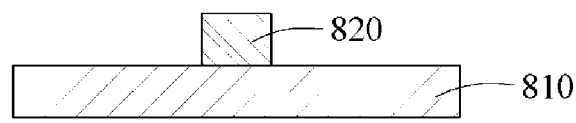

FIG. 8h illustrates a step in which the mask layer 830 is removed. For example, the mask layer 830 may be etched using an etchant for the mask layer 830.

Figure 8I:
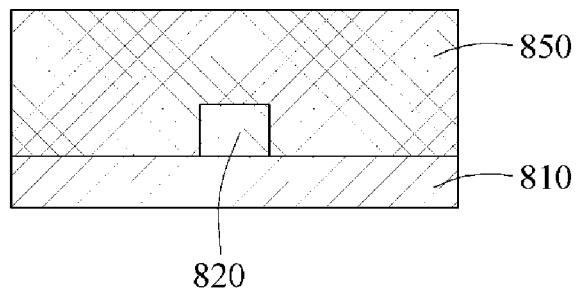

FIG. 8i illustrates a step in which an overcladding layer 850 is formed on the wafer 810 and the core layer 820. For example, the overcladding layer 850 may be deposited through CVD.

Figure 8J:
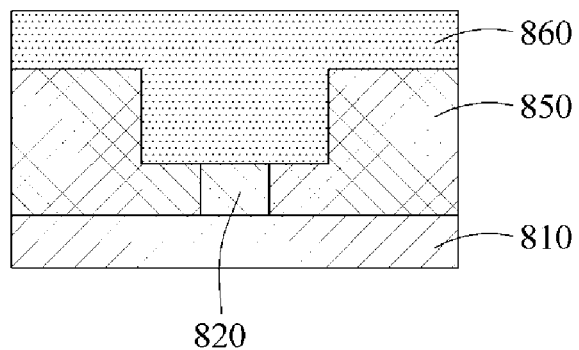

FIG. 8j illustrates a structure that is formed when a saturable absorption layer 860 is formed on the core layer 820 and the overcladding layer 850 after at least a portion of the overcladding layer 850 is selectively removed. In an example embodiment, a portion of the overcladding layer 850 that is selectively removed may be a portion of a saturable absorber in an integrated optical chip. For example, the overcladding layer 850 may be removed and the saturable absorption layer 860 may be formed such that the saturable absorption layer 860 is to be disposed to interact with an evanescent field of light guided through at least a portion of the core layer 820.

Figure 8K:
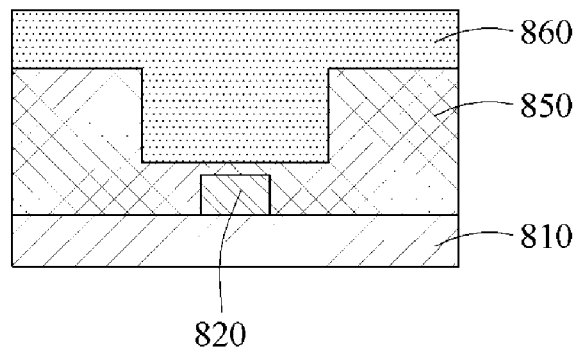
Figure 8L:
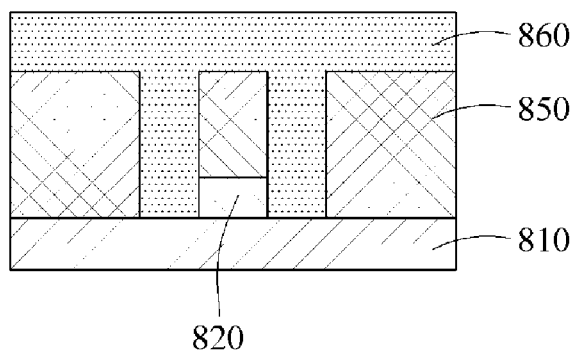
Figure 8M:
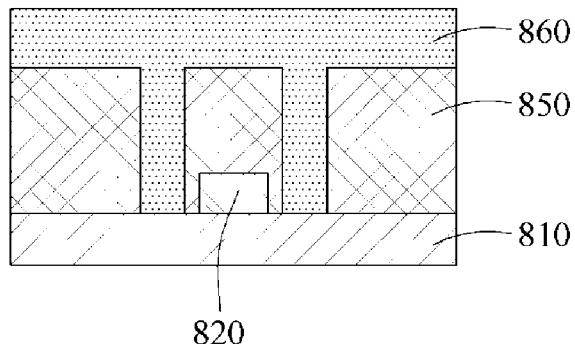

FIGS. 8k through 8m illustrate examples of the overcladding layer 850 and the saturable absorption layer 860 that are embodied in various forms according to an example embodiment. Similarly to the structure illustrated in FIG. 8j, the overcladding layer 850 and the saturable absorption layer 860 may be disposed such that the saturable absorption layer 860 interacts with an evanescent field of light guided through at least a portion of the core layer 820. The overcladding layer 850 and the saturable absorption layer 860 may be embodied in different forms and provided at different locations from the illustrated examples, and thus forms and locations thereof may not be limited to the illustrated examples.

As described above, an integrated optical chip may be manufactured on a wafer through, for example, a deposition process, a photolithography process, and an etching process. When a plurality of integrated optical chips is manufactured on the wafer, a dicing process may be performed to produce a great number of the integrated optical chips at once. Thus, compared to an existing production process of femtosecond lasers, productivity may be improved greatly in terms of time consumption and costs.

Although example embodiments are described based on a femtosecond laser in a case in which a mode-locked pulse width is a unit of femtoseconds, or less than 1 picosecond, the example embodiments may also be applicable to a pulse laser having a pulse width in addition to the femtosecond laser. A pulse width may increase or decrease by adjusting performance of an integrated optical chip, as necessary. Thus, the example embodiments described herein may not be limited to a femtosecond laser.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An integrated optical chip comprising:
   a substrate;
   a plurality of planar lightwave circuit-based optical components that is formed on one surface of the substrate, wherein the optical components include a saturable absorber having a nonlinear loss characteristic, wherein the saturable absorber includes:
   (i) a core layer formed on the one surface of the substrate;
   (ii) an overcladding layer covering at least a portion of the core layer; and
   (iii) a saturable absorption layer includes at least one of a carbon nanostructure or a topological insulator and is formed on at least a portion of the overcladding layer and disposed to interact with an evanescent field of light guided through at least a portion of the core layer; and
   a plurality of optical waveguides that is formed on the one surface of the substrate and connects the optical components to one another.

2. The integrated optical chip of claim 1, wherein the optical components include a wavelength division multiplexer.

3. The integrated optical chip of claim 2, wherein the wavelength division multiplexer includes:
   a core layer formed on the one surface of the substrate and including a plurality of separated optical waveguides; and
   an overcladding layer covering at least a portion of the core layer.

4. The integrated optical chip of claim 1, wherein the optical components include an output coupler.

5. The integrated optical chip of claim 4, wherein the output coupler includes:
   a core layer formed on the one surface of the substrate and including a plurality of separated optical waveguides; and
   an overcladding layer covering at least a portion of the core layer.

6. The integrated optical chip of claim 1, wherein the substrate includes a material having a refractive index lower than a refractive index of the optical waveguides.

7. The integrated optical chip of claim 1, further comprising:
   an undercladding layer interposed between the substrate and the optical waveguides,
   wherein the undercladding layer includes a material having a refractive index lower than a refractive index of the optical waveguides.

8. The integrated optical chip of claim 1, wherein the optical components and the optical waveguides are formed using at least one of a deposition process, a photolithography process, an etching process, or an ion exchange process.

9. A method of manufacturing an integrated optical chip, the method comprising:
  providing a wafer;
  forming an optical waveguide on the wafer;
  forming an overcladding layer on the wafer and the optical waveguide;
  removing at least a portion of the overcladding layer; and
  forming, on the overcladding layer, a saturable absorption layer having a nonlinear loss characteristic,
  wherein the saturable absorption layer includes at least one of a carbon nanostructure or a topological insulator and is disposed to interact with an evanescent field of light guided through at least a portion of the optical waveguide.

10. The method of claim 9, wherein the forming of the optical waveguide includes:
  forming a core layer on the wafer; and
  forming an optical waveguide that is extended with a rectangular cross section by removing at least a portion of the core layer.

11. The method of claim 10, further comprising:
  forming a mask layer on the core layer; and
  removing at least a portion of the mask layer through a photolithography process.

12. The method of claim 9, further comprising:
  dividing the wafer into a plurality of integrated optical chips by cutting the wafer.

13. The method of claim 9, wherein the wafer includes a material having a refractive index lower than a refractive index of the optical waveguide.

14. The method of claim 9, further comprising:
  forming, on the wafer, an undercladding layer including a material having a refractive index lower than a refractive index of the optical waveguide,
  wherein forming a core layer includes forming the core layer on the undercladding layer.

* * * * *